(12) United States Patent
Wantling

(10) Patent No.: US 8,404,040 B2
(45) Date of Patent: Mar. 26, 2013

(54) CURING OR SEALING COMPOSITIONS FOR CONCRETE AND CEMENT FORMULATIONS AND PROCESSES FOR USING THE SAME

(75) Inventor: Steven J. Wantling, Hoover, AL (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 475 days.

(21) Appl. No.: 12/498,481

(22) Filed: Jul. 7, 2009

(65) Prior Publication Data

US 2011/0005431 A1  Jan. 13, 2011

(51) Int. Cl.
  *C04B 16/02* (2006.01)
(52) U.S. Cl. ...... 106/805; 106/660; 264/120; 428/297.4; 428/292.4; 523/122; 524/556; 524/559; 524/560; 524/566; 524/444; 524/446; 524/456
(58) Field of Classification Search .................. 106/660
  See application file for complete search history.

(56) References Cited

U.S. PATENT DOCUMENTS

| | | | | |
|---|---|---|---|---|
| 1,814,292 A * | 7/1931 | Chittick | ........................ | 106/822 |
| 1,920,627 A * | 8/1933 | Brassert | ........................ | 427/314 |
| 2,432,963 A * | 12/1947 | Camp | ........................ | 106/660 |
| 2,803,555 A * | 8/1957 | Clark, Jr. et al. | ............. | 106/681 |
| 2,839,811 A * | 6/1958 | Benedict et al. | ............. | 106/660 |
| 3,171,335 A | 3/1965 | Pincon et al. | | |
| 3,189,469 A * | 6/1965 | Littler et al. | ................... | 106/660 |
| 3,202,522 A * | 8/1965 | Yang et al. | .................... | 106/701 |
| 3,232,777 A * | 2/1966 | Bush | ........................ | 106/708 |
| 3,437,611 A * | 4/1969 | Macklin | ........................ | 523/403 |
| 3,563,786 A | 2/1971 | Tse et al. | | |
| 3,870,422 A | 3/1975 | Medico, Jr. | | |
| 4,153,743 A * | 5/1979 | Caramanian | ................. | 427/136 |
| 4,207,115 A | 6/1980 | Boehme et al. | | |
| 4,656,005 A | 4/1987 | Arpin | | |
| 4,748,196 A | 5/1988 | Kuroda et al. | | |
| 5,085,708 A | 2/1992 | Moriya et al. | | |
| 5,173,117 A | 12/1992 | Inokawa et al. | | |
| 5,188,765 A * | 2/1993 | Ehrhardt | ........................ | 106/14.5 |
| 5,584,958 A * | 12/1996 | Gillis et al. | ................. | 156/331.4 |
| 5,788,407 A | 8/1998 | Hwang | | |
| 6,010,596 A | 1/2000 | Song | | |
| 6,315,825 B1 * | 11/2001 | Black | ............................ | 106/660 |
| 6,585,820 B2 | 7/2003 | Wantling et al. | | |
| 6,652,643 B1 * | 11/2003 | Black | ............................ | 106/660 |
| 6,663,707 B2 | 12/2003 | Wantling et al. | | |
| 7,294,189 B2 | 11/2007 | Wantling | | |
| 7,374,610 B2 | 5/2008 | Wantling | | |
| 7,473,712 B2 | 1/2009 | Wantling et al. | | |
| 7,473,713 B2 | 1/2009 | Wantling et al. | | |
| 2003/0061971 A1 | 4/2003 | Crook et al. | | |
| 2006/0009535 A1 * | 1/2006 | Wantling | ....................... | 106/271 |
| 2006/0051619 A1 | 3/2006 | Wantling et al. | | |
| 2006/0100341 A1 | 5/2006 | Mosquet et al. | | |
| 2006/0243323 A1 | 11/2006 | Wantling et al. | | |
| 2006/0283356 A1 * | 12/2006 | Donlon et al. | ................. | 106/660 |
| 2007/0181035 A1 * | 8/2007 | Wantling et al. | .............. | 106/270 |
| 2009/0235844 A1 | 9/2009 | Wantling | | |
| 2009/0235845 A1 | 9/2009 | Wantling | | |
| 2009/0272292 A1 | 11/2009 | Wantling | | |
| 2009/0297818 A1 * | 12/2009 | Williams et al. | ........... | 428/292.4 |

FOREIGN PATENT DOCUMENTS

| | | | |
|---|---|---|---|
| JP | 6 180002 A | | 6/1994 |
| JP | 2 968868 B | | 11/1999 |
| JP | 2001 233662 A | | 8/2001 |
| JP | 2005344433 A | * | 12/2005 |
| JP | 2008 008125 A | | 1/2008 |
| WO | WO 95/35145 A1 | | 12/1995 |
| WO | WO 01/40134 | | 6/2001 |
| WO | WO 2005039841 A2 | * | 5/2005 |

* cited by examiner

*Primary Examiner* — Kaj K Olsen
*Assistant Examiner* — Ross J Christie

(57) ABSTRACT

Disclosed are wax emulsion compositions for curing or sealing concrete and cement formulations, methods for preparing and processes for using the same. The modifiers are applicable to curing or sealing membranes, used in roadways, highways, parking lots and other freshly placed or poured concrete surfaces to retain moisture and achieve high compressive strengths. This invention also relates to materials used to coat, spray, brush, roll etc. on conventional Portland cement concrete mix designs or other applied concrete mixes in formed structural shapes and transport road mix designs, providing an effective layer that controls and minimizes moisture loss from the mix to enable proper curing and achievement of desired compressive strengths. The compositions of the invention further provide for concrete and cement formulations having lower water soluble chloride content.

7 Claims, No Drawings

CURING OR SEALING COMPOSITIONS FOR CONCRETE AND CEMENT FORMULATIONS AND PROCESSES FOR USING THE SAME

FIELD OF THE INVENTION

The present invention relates to curing or sealing compositions for concrete and cement formulations, which compositions include a paraffin hydrocarbon wax, a saponifiable wax, a saponifier, and an optional dispersant, to methods for their preparation and processes for using the same. The compositions of the invention are applicable for curing or sealing concrete used in roadways, highways, parking lots and other freshly placed or poured surfaces to retain moisture and achieve high compressive strengths. This invention also relates to compositions used to coat, spray, brush, roll etc. on conventional Portland cement concrete mix designs or other applied concrete mixes in formed structural shapes as well as transport road mix designs. The compositions of the invention provide an effective layer that controls and minimizes moisture loss from the mix to enable proper curing and achievement of high compressive strengths. The compositions of the invention further provide for concrete and cement formulations having lower water soluble chloride content.

BACKGROUND OF THE INVENTION

Curing and sealing compounds are commonly used in the concrete industry to enhance physical property development of freshly poured concrete mixes. Desired materials are those that combine ease of application, effective film forming characteristics, the ability to penetrate and seal pores or imperfections in the concrete, low hazards characteristics, minimal or no VOC emissions, and availability at a competitive cost. However, many of the materials currently offered today do not provide the favorable mix of such attributes required by the concrete industry.

Concrete curing compounds are typically applied as a coating to the surface of freshly poured concrete, in order to provide a water impermeable layer to keep moisture in the concrete mix from evaporating too quickly, thereby maintaining a proper hydration level for correct curing and compressive strength development. Concrete sealing compounds are used in the long term to protect the concrete mixture from materials like, alkali metal salts, which can leach in and lead to cracking, early degradation or failure.

Currently available materials for curing or sealing purposes include acrylic based resins, emulsion polymers, wax emulsions, urethane based polymers, naturally derived materials and others. Some are used for individual purposes, either sealing or curing, and others serve dual purposes as both sealing and curing compounds. These materials are typically formulated with pigments such as titanium dioxide ($TiO_2$) to serve as a reflecting surface to sunlight, to minimize heat absorption thereby lowering the temperature of the curing concrete to allow for proper curing, strength development and reducing internal stresses.

Water based materials for both sealing and curing applications are highly desirable because of ease of handling and clean-up, the elimination of volatile organic compounds, and the elimination of flammability hazards associated with solvents. While solvent based materials have demonstrated the ability to meet standard performance requirements for curing, they are used preferentially in sealing applications.

The prior art provides for wax emulsion compositions, and a process for improving the early strength of cement aggregate products, in a stabilized aqueous emulsion with a surfactant such as alkali metal salts of fatty acids, alkali metal salts of sulfated fatty acids, alkali metal alkyl sulfates, alkali metal alkyl sulfonates, alkali metal aryl sulfonates, alkali metal alkyl lauryl sulfonate, alkali metal salts of alkylated naphthalene, alkali metal salts of lignosulfonic acid, condensation products of ethylene oxide and polyalkylene glycols, fatty acid glycerides, fatty acid amides, polyethylene sorbitol esters of fatty acids, quarternary ammonium halides, sorbitan esters, sulfonated or sulfated fatty acid esters or amides, and sulfonic acid.

The prior art also indicates that the introduction of wax emulsion compositions is specifically targeted to curing applications of concrete products not to dual purpose curing and sealing functions. Wax emulsions have been identified as good film-forming materials, but lacking the overall water retention capability unless coupled with other resins or components, such as hydrocarbon resins for example.

SUMMARY OF THE INVENTION

In one embodiment, the present invention provides an aqueous emulsion, useful as a curing compound for cementitious mixes, to achieve water loss levels of <0.55 kg/m$_2$ in 72 hours, at a 150 ft2/gal application rate as tested in accordance with ASTM-309, which emulsion includes a paraffin hydrocarbon wax, a saponifiable wax, a saponifier, and an optional dispersant.

In another embodiment, the present invention provides an aqueous emulsion, useful as a curing compound for cementitious mixes, to achieve water loss levels of <0.55 kg/m$_2$ in 72 hours, at a 150 ft2/gal application rate as tested in accordance with ASTM-309, which emulsion includes essentially only a paraffin hydrocarbon wax, a saponifiable wax, a saponifier, and an optional dispersant.

In another embodiment, the present invention provides a method for preparing an aqueous emulsion, useful as a curing compound for cementitious mixes, to achieve water loss levels of <0.55 kg/m$_2$ in 72 hours, at a 150 ft2/gal application rate as tested in accordance with ASTM-309, which method includes the steps of combining water, a paraffin hydrocarbon wax, a saponifiable wax and a saponifier, heating the combination to a temperature of between about 185° F. (85° C.) to about 205° F. (96.1° C.), then homogenizing the mixture.

In one embodiment, the present invention provides an aqueous emulsion, useful as a curing and sealing compound for cementitious mixes, to achieve water loss levels of <0.55 kg/m$_2$ in 72 hours, at a 150 ft2/gal application rate as tested in accordance with ASTM-309, and perform effectively in salt water penetration tests, such as ASTM-C 1218, which emulsion includes a paraffin hydrocarbon wax, a saponifiable wax, a saponifier, and an optional dispersant.

In another embodiment, the present invention provides an aqueous emulsion, useful as a curing compound for cementitious, to achieve water loss levels of <0.55 kg/m$_2$ in 72 hours, at a 150 ft2/gal application rate as tested in accordance with ASTM-309, which emulsion, and perform effectively in salt water penetration tests such as ASTM-C 1218, which emulsion includes essentially only a paraffin hydrocarbon wax, a saponifiable wax, a saponifier, and an optional dispersant.

In another embodiment, the present invention provides a method for preparing an aqueous emulsion, useful as a curing compound for cementitious mixes to achieve water loss levels of <0.55 kg/m$_2$ in 72 hours, at a 150 ft2/gal application rate as tested in accordance with ASTM-309, and perform effectively in salt water penetration tests such as ASTM-C 1218, which method includes the steps of combining water, a paraffin hydrocarbon wax, a saponifiable wax and a saponifier, heating the combination to a temperature of between about 185° F. (85° C.) to about 205° F. (96.1° C.), then homogenizing the mixture.

In another embodiment, the present invention provides for concrete and cement formulations coated or sealed with the emulsions described herein.

DETAILED DESCRIPTION OF THE INVENTION

It has been found that the aqueous emulsion compositions of the invention, which include a paraffin wax, a saponifiable wax, a saponifier, and optionally a dispersing agent, when applied to a freshly poured or placed concrete surface, provide superior water retention properties to meet the early strength standard requirements of tests such as ASTM-309. In addition, it has been discovered that these unique emulsions penetrate the concrete matrix to serve as an effective sealing compound, as demonstrated in tests such as ASTM-C 1218.

In one embodiment the paraffin hydrocarbon wax has a melting point in the range of about 50° C. to about 70° C. In another embodiment the paraffin wax contains one or more $C_nH_{2n+2}$ hydrocarbons, where n is an integer between 18 and 42. The paraffin wax may comprise about 10 to about 40 wt % of the emulsion. In another embodiment, the paraffin wax may comprise about 15 to about 35 wt % of the emulsion. In another embodiment, the paraffin wax may comprise about 15 to about 25 wt % of the emulsion.

In one embodiment, the second wax is a Montan wax, also known as lignite wax, having a melting point in the range of 70° C. to 100° C. and an acid value greater than 25, and a saponification number greater than 85. The second wax may also be from a class of waxes characterized in that it has both an acid value and a saponification value, for example, carnauba wax, candelilla wax, bayberry-myrtle wax, Japan wax, and the like. The second wax may also be a combination or any subset of such saponifiable waxes. In one embodiment, the second wax is present in the emulsion is between about 0.01 to about 20 parts, by weight, per 100 parts of the paraffin wax. In another embodiment, the second wax is present in an amount of between about 0.01 to about 10 parts, by weight, per 100 parts of the paraffin wax. In another embodiment, the second wax is present in an amount of between about 0.5 to about 7 parts, by weight, per 100 parts of the paraffin wax. In another embodiment, the second wax is present in an amount of between about 0.02 to about 5 parts, by weight, per 100 parts of the paraffin wax.

Saponification of such waxes, as is known in the art, may be accomplished by combining the wax with a strongly basic material such as an ammonia hydroxide or an alkali metal hydroxide such as potassium hydroxide, sodium hydroxide or lithium hydroxide. The amount of saponifier needed may be calculated based on the saponification value of the wax. For one example, the saponification value divided by 1000 equals the grams of potassium hydroxide to add per gram of wax. For Montan wax, at least 0.1 part potassium hydroxide, by weight, or less than 1 part by weight sodium hydroxide, or more than 0.1 part by weight ammonium hydroxide is required per part of Montan wax. The actual amount of the alkali metal or ammonium hydroxide required can be readily determined by those skilled in the art.

In certain embodiments of the present invention a dispersing aid, or fluidity modifier, maybe useful. Such dispersing agents are strong lipophiles, which are, consequently, good defoamers. One such dispersing agent is poly(oxy-1,2-ethanedyl), alpha-phenyl-omega-hydroxy styrenate. A salt of polynaphthalenesulfonic acid may also be utilized as a dispersant/surfactant. The salt may be produced by the reaction of polynaphthalenesulfonic acid and a saponifier. One commercially available polynaphthalenesulfonic acid is DISAL GPS, which may be obtained from Handy Chemical, Montreal, Quebec, Canada. DURASAR Polynaphthalene sulfonate calcium salts, also available from Handy Chemical, Montreal, Quebec, Canada, may also be used as dispersing agent. In one embodiment, the dispersant/surfactant may comprise about 0.1 to about 5 wt % of the emulsion. In another embodiment the dispersant/surfactant may comprise about 0.25 to about 5 wt % of the emulsion.

It has been found that the aqueous emulsion compositions of the invention, which include a paraffin wax, a saponifiable wax, a saponifier, and optionally a dispersing agent are highly compatible with pigments such as titanium dioxide. In addition concentrated emulsions at high percent solids can be easily diluted to lower concentrations while maintaining a stable emulsion.

In one embodiment, the aqueous emulsion compositions of the invention are used as a curing or sealing compound, and also components of the emulsion are incorporated or admixed in the preparation of the cement mixes, for example as part of the aqueous component, which is believed to provide additional compatibility leading to both desired strength requirements and desired water retention properties. Such cement mixes may be free of high range water reducers, viscosity or rheology modifiers, or mix retarders.

In one embodiment, the aqueous emulsion of the invention is advantageously utilized to achieve water loss levels of <0.55 kg/m$_2$ in 72 hours, at a 150 ft2/gal application rate as tested in accordance with ASTM-309. In another embodiment, the aqueous emulsion of the invention is effectively utilized as a penetrating sealer to pass salt water penetration tests such as ASTM-C 1218. In another embodiment, the aqueous emulsion of the invention is applied as a surface coating which further penetrates the surface of cementitious mix to a depth of at least 34 inches.

In one embodiment, the aqueous emulsions of the invention are free of coagulants which coagulate film forming synthetic polymers when those polymers are in the presence of calcium ions of fresh concrete or mortar. In another embodiment, the emulsions of the invention are free of synthetic polymers.

In one embodiment, the aqueous emulsions of the invention are free of olefin-maleic anhydride derivatives.

In one embodiment, the aqueous emulsion of the invention is applied as a surface coating and is not utilized as an aqueous ingredient in the preparation of a cementitious product.

In one embodiment, the aqueous wax emulsions are prepared in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

EXAMPLES

Example 1

Table 1 sets forth the formulation of the composition utilized in the examples. In a typical preparation, the water and water soluble components were combined then heated to a temperature of between about 185° F. (85° C.) to about 205° F. (96.1° C.). The wax compounds were incorporated and also heated to a temperature of between about 185° F. (85° C.) to about 205° F. (96.1° C.). The aqueous and wax mixtures were combined and the resultant mixture was then placed in a homogenizer. With homogenization, it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig. To this base composition, 7.5 wt % TiO2 was added to achieve the ASTM C 309 Type 1 membrane-forming compound, and 8.5% by volume TiO2 was added to achieve the ASTM C309 Type 2 membrane-forming compound.

TABLE 1

Composition Formulation

| Component | Weight Percent (wt %) |
|---|---|
| Paraffin Wax | 20 |
| Montan Wax | 1.0 |
| DISAL[1] Dispersant | 1.0 |
| 45% aq. KOH | 0.25 |
| Water | 77.75 |

[1]DISAL is a polynaphthalenesulfonic acid dispersant available from Handy Chemical, Montreal, Quebec, Canada.

Example 2

The composition of Example 1 of the invention was tested for suitability as a membrane forming compound for curing concrete in accordance with ASTM 309. The results are summarized in Table 2.

TABLE 2

|  | ASTM C-309 Requirement | Example 1 |
|---|---|---|
| Water Retention | <0.55 kg/m2 in 72 hours | 0.16 |
| Daylight Reflectance | >60% | 61.8% |
| Drying Time | <4 Hours | <4 Hours |

Example 3

The water soluble chloride content of concrete powder specimens was measured in accordance with ASTM 1218. The results are summarized in Tables 3A, 3B, 3C and 3D, wherein Examples 1-4 utilize the wax emulsion of Example 1 of the invention. Comparative Examples A1-A4 incorporated prior art wax emulsions, without the saponifiable wax. Comparative Examples B and D are baseline control concrete samples, not exposed to chloride salts. Comparative Examples C1-C4 are concrete control samples, exposed to the chloride salts, and Comparative Examples X1-X4 utilize a XUREX nano-coating, which is commercially from Xurex, Inc.

TABLE 3A

| Example | Chloride Content % of Concrete | Chloride Content % of Cementitious[1] | Chloride Content lb/yd$^{3(2)}$ |
|---|---|---|---|
| 1 | 0.005 | 0.033 | 0.205 |
| 2 | 0.023 | 0.144 | 0.893 |
| 3 | 0.005 | 0.030 | 0.187 |
| 4 | 0.015 | 0.095 | 0.592 |
| Comparative A1 | 0.059 | 0.372 | 2.304 |
| Comparative A2 | 0.017 | 0.106 | 0.657 |
| Comparative A3 | 0.020 | 0.123 | 0.765 |
| Comparative A4 | 0.035 | 0.224 | 1.388 |

[1]Based on a total cementitious content of 620 lb/yd$^3$
[2]Based on a concrete weight of 3915 lb/yd$^3$

TABLE 3B

| Example | Chloride Content % of Concrete | Chloride Content % of Cementitious[3] | Chloride Content lb/yd$^{3(4)}$ |
|---|---|---|---|
| Comparative B | 0.002 | 0.009 | 0.077 |

[3]Based on a total cementitious content of 846 lb/yd$^3$
[4]Based on a concrete weight of 3697 lb/yd$^3$

TABLE 3C

| Example | Chloride Content % of Concrete | Chloride Content % of Cementitious[1] | Chloride Content lb/yd$^{3(2)}$ |
|---|---|---|---|
| Comparative C1 | 0.004 | 0.025 | 0.152 |
| Comparative C2 | 0.058 | 0.369 | 2.285 |
| Comparative C3 | 0.039 | 0.248 | 1.538 |
| Comparative C4 | 0.067 | 0.424 | 2.627 |
| Comparative X1 | 0.027 | 0.173 | 1.074 |
| Comparative X2 | 0.038 | 0.242 | 1.499 |
| Comparative X3 | 0.052 | 0.327 | 2.029 |
| Comparative X4 | 0.024 | 0.150 | 0.929 |

[1]Based on a total cementitious content of 620 lb/yd$^3$
[2]Based on a concrete weight of 3915 lb/yd$^3$

TABLE 3D

| Example | Chloride Content % of Concrete | Chloride Content % of Cementitious[5] | Chloride Content lb/yd$^{3(6)}$ |
|---|---|---|---|
| Comparative D | 0.001 | 0.004 | 0.025 |

[5]Based on a total cementitious content of 643 lb/yd$^3$
[6]Based on a concrete weight of 3859 lb/yd$^3$ While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

The invention claimed is:
1. A process for curing or sealing concrete and cement formulations comprising:
   a) combining into an emulsion, components comprising: about 10 to about 40 wt % of a paraffin hydrocarbon wax, based upon the weight of the emulsion, about 0.01 to about 20 parts by weight of a saponifiable wax, per 100 parts of a paraffin wax, a saponifier, and about 0.1 to about 5 wt % of a dispersant, based upon the weight of the emulsion to form an aqueous emulsion;
   b) applying the aqueous emulsion to a surface of the concrete or cement formulation; and
   c) curing, sealing, or both curing and sealing, the concrete or cement formulation, wherein the aqueous emulsion is free of synthetic polymers.

2. The process of claim 1, further comprising heating the aqueous emulsion to a temperature of between about 185° F. (85° C.) to about 205° F. (96.1° C.), then homogenizing the mixture prior to applying the aqueous emulsion.

3. The process of claim 1, wherein the aqueous emulsion penetrates the surface of concrete or cement formulation to a depth of at least ¾ inches.

4. The process of claim 1, wherein the aqueous emulsion is free of olefin-maleic anhydride derivatives.

5. The process of claim 1, wherein the aqueous emulsion consists essentially of about 10 to about 40 wt % of the paraffin hydrocarbon wax, based upon the weight of the emulsion, about 0.01 to about 20 parts by weight of the saponifiable wax, per 100 parts of the paraffin wax, a saponifier, and about 0.1 to about 5 wt % of a dispersant, based upon the weight of the emulsion.

6. The process of claim 1, wherein the concrete or cement formulation is prepared by admixing as an aqueous component a composition comprising a paraffin hydrocarbon wax, a saponifiable wax, a saponifier, and a dispersant.

7. The process of claim 1, wherein the paraffin hydrocarbon wax has a melting point between about 50° C. to about 70° C., the saponifiable wax is a Montan wax having a melting point in the range of between about 70° C. to about 100° C., an acid number greater than 25, and a saponification number of greater than 85, the saponifier is ammonia hydroxide or an alkali metal hydroxide, and the dispersant is polynaphthalenesulfonic acid.

* * * * *